(12) United States Patent
Petteway

(10) Patent No.: US 9,032,948 B1
(45) Date of Patent: May 19, 2015

(54) SEASONING GRILL

(76) Inventor: Jeffrey M. Petteway, North Richland Hills, TX (US)

( * ) Notice: Subject to any disclaimer, the term of this patent is extended or adjusted under 35 U.S.C. 154(b) by 1155 days.

(21) Appl. No.: 12/883,123

(22) Filed: Sep. 15, 2010

(51) Int. Cl.
- A47J 37/07 (2006.01)
- A47J 27/04 (2006.01)
- F24B 1/193 (2006.01)
- F24C 15/16 (2006.01)

(52) U.S. Cl.
CPC .................................. A47J 37/0704 (2013.01)

(58) Field of Classification Search
CPC .............. A47J 37/0647; A47J 37/0763; A47J 37/0713; A47J 37/0754; F24C 15/101; F24C 15/166; F23H 3/02
USPC ......... 126/25 R, 163 R, 29, 9 B, 41 R, 152 B; 99/447, 449, 345, 346, 347, 450; 138/37, 39, 43, 46
See application file for complete search history.

(56) References Cited

U.S. PATENT DOCUMENTS

| | | | | |
|---|---|---|---|---|
| 976,080 A * | 11/1910 | Kaufman | 122/374 |
| 2,500,323 A * | 3/1950 | Puckett | 122/371 |
| 2,512,431 A * | 6/1950 | Klijzing | 122/374 |
| 2,621,608 A * | 12/1952 | McIntyre | 417/46 |
| 2,816,538 A * | 12/1957 | Miller et al. | 126/25 R |
| 3,279,681 A * | 10/1966 | Bandlow | 415/99 |
| 3,439,652 A * | 4/1969 | Clark | 122/374 |
| 3,959,620 A * | 5/1976 | Stephen, Jr. | 219/386 |
| 4,321,857 A * | 3/1982 | Best | 99/340 |
| 4,350,140 A * | 9/1982 | Hamilton, Jr. | 126/276 |
| 4,829,975 A * | 5/1989 | Hait | 126/9 R |
| 4,849,609 A * | 7/1989 | Perrichon | 219/448.12 |
| 4,876,972 A * | 10/1989 | Mrklas | 110/298 |
| 5,009,151 A * | 4/1991 | Hungerford | 99/445 |
| 5,086,752 A * | 2/1992 | Hait | 126/9 R |
| 5,189,945 A * | 3/1993 | Hennick | 99/339 |
| 5,211,105 A * | 5/1993 | Liu | 99/446 |
| 5,282,741 A * | 2/1994 | Massaro et al. | 432/77 |
| 5,353,880 A * | 10/1994 | Green | 169/65 |
| 5,511,535 A * | 4/1996 | Landstrom et al. | 126/25 C |
| 5,636,581 A * | 6/1997 | Kleen et al. | 110/270 |
| 5,713,345 A * | 2/1998 | Bentsen et al. | 126/152 B |
| 5,788,480 A * | 8/1998 | Bentsen et al. | 432/78 |
| 5,850,830 A * | 12/1998 | Smith | 126/552 |
| 6,220,190 B1 * | 4/2001 | Dumbaugh et al. | 110/328 |
| 6,431,164 B1 * | 8/2002 | Wardell | 126/5 |
| 6,481,343 B1 * | 11/2002 | Rigney et al. | 99/396 |
| 6,484,714 B1 * | 11/2002 | Smith | 126/525 |
| 6,792,854 B2 * | 9/2004 | Tafel | 101/350.1 |
| 8,011,359 B1 * | 9/2011 | Schultz | 126/80 |
| 8,176,948 B2 * | 5/2012 | Carrig | 141/21 |
| 2004/0107852 A1 * | 6/2004 | Tafel | 101/350.1 |
| 2007/0028912 A1 * | 2/2007 | Gagas et al. | 126/9 R |
| 2007/0125357 A1 * | 6/2007 | Johnston | 126/41 R |
| 2008/0163763 A1 * | 7/2008 | Hoyles et al. | 99/444 |

* cited by examiner

*Primary Examiner* — Kang Hu
*Assistant Examiner* — Daniel E Namay
(74) *Attorney, Agent, or Firm* — Law Office of J. D. Pemberton

(57) ABSTRACT

The present invention relates to an improved grill grate wherein an automated cooking oil system is incorporated into the design of said grill grate. The invention includes a grill grate that has a plurality of outlet holes that align the top surface of the grill grate. The invention also includes a cooking oil pumping system that is in connection with the grill grate.

17 Claims, 4 Drawing Sheets

SEASONING GRILL

I. CROSS-REFERENCE TO RELATED APPLICATION

Figure 1:
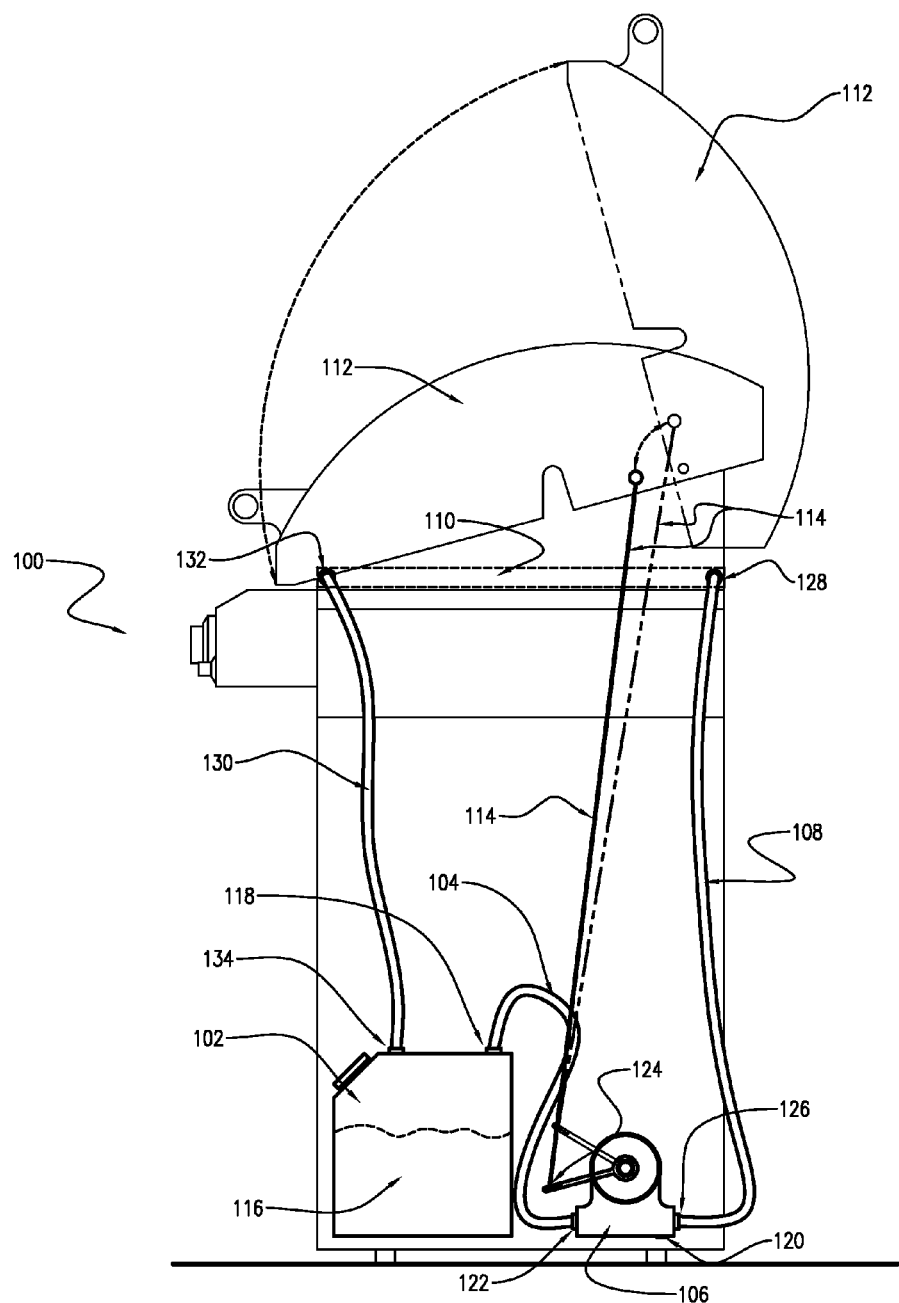

The present disclosure claims the benefit of U.S. application Ser. No. 12/128,844 filed May 29, 2008, which is incorporated by reference herein in its entirety and to which priority is claimed.

II. FIELD

The present disclosure is generally related to grills, and more specifically, generally related to a cooking grate of a grill.

III. DESCRIPTION OF RELATED ART

Grilling is a form of cooking that involves dry heat applied to the surface of food, commonly from above or below. Food to be grilled is typically suspended above a heat source and the grilling is often performed outdoors, using charcoal, wood (real wood or preformed briquettes), propane, or natural gas for the heat source. A grill grate is used to support the food and the grill grate is typically seasoned or cured to help protect and prolong the life of the grate.

One method of seasoning the grill grate is to spray the surface of the grill grate with cooking oil. When spraying the grill grate, often a large portion of the cooking oil is wasted while only a relatively small area of the grill grate is covered with the cooking oil. Another method of seasoning the grill grate is to mop or brush the surface of the grill grate with cooking oil. Mopping the cooking oil onto the grill grate creates a mess as the cooking oil often drips from the brush on to burners below the grill grate and sometimes only a relatively small area of the grill grate is covered with the cooking oil.

IV. SUMMARY

In a particular embodiment, a grill comprises a grill grate where the grill grate has an inlet, a fluid container to contain a fluid, and a pump to pump the fluid from the fluid container and into the grill grate though the inlet. The grill grate is hollow such that fluid can flow inside of the grill grate. In a particular embodiment, the grill has an actuating rod attached to a grill lid and the pump such that when the grill lid is closed, the pump is activated and pumps the fluid into the grill grate. In a particular embodiment, the pump is a ratcheted gear pump such that when a grill lid covering the grill grate is opened, the ratcheted gear pump is ratcheted and very little if any resistance other than the weight of the grill lid is felt. Then, when the grill lid is closed, the ratcheted gear pump pumps the fluid into the grill grate. The grill grate is made of a porous material such that as heat is applied to the grill grate, the pores of the porous material expand to allow the fluid inside the grill grate to leach out.

In a particular embodiment, a method for seasoning a grill comprises pumping a fluid into a grill grate using a pump. The grill grate is hollow such that fluid can flow inside of the grill grate. In a particular embodiment, the grill grate is made of cast iron and the fluid is cooking oil such that as heat is applied to the grill grate, the pores of the cast iron expand to allow the cooking oil inside the grill grate to leach out. In a particular embodiment, the pump is a foot pump where a user steps on the foot pump to pump the fluid from a fluid container and into the grill grate.

In a particular embodiment, a grill grate contains a hollow frame where the hollow frame contains an inlet to allow a fluid to flow into the hollow frame. The grill grate also contains a plurality of hollow ribs contained within the hollow frame where the plurality of hollow ribs are attached to the hollow frame such that the fluid can flow throughout the plurality of hollow ribs. In use, the grill grate may be purchased as an accessory to be added to an existing grill. The grill grate is connected to a pump such that the pump can pump fluid from a fluid reservoir into the grill grate.

One particular advantage provided by at least one of the disclosed embodiments is that the grill grate may be seasoned from the inside. Another particular advantage provided by at least one of the disclosed embodiments is that the entire surface of the grill grate can be seasoned with little or no oil coming into contact with burners below the grate. Another particular advantage provided by at least one of the disclosed embodiments is that the fluid used to season the grill grate is pumped into the grill grate every time a lid that covers the grill grate is closed.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

Figure 2:
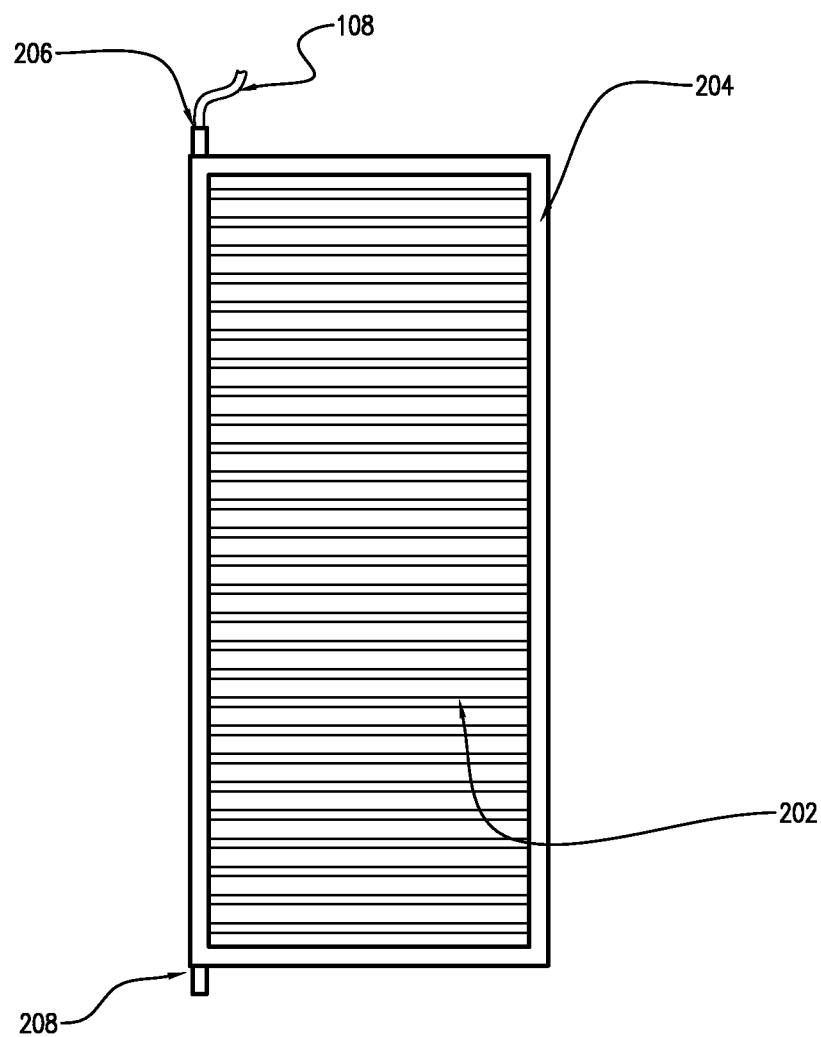
Figure 3:
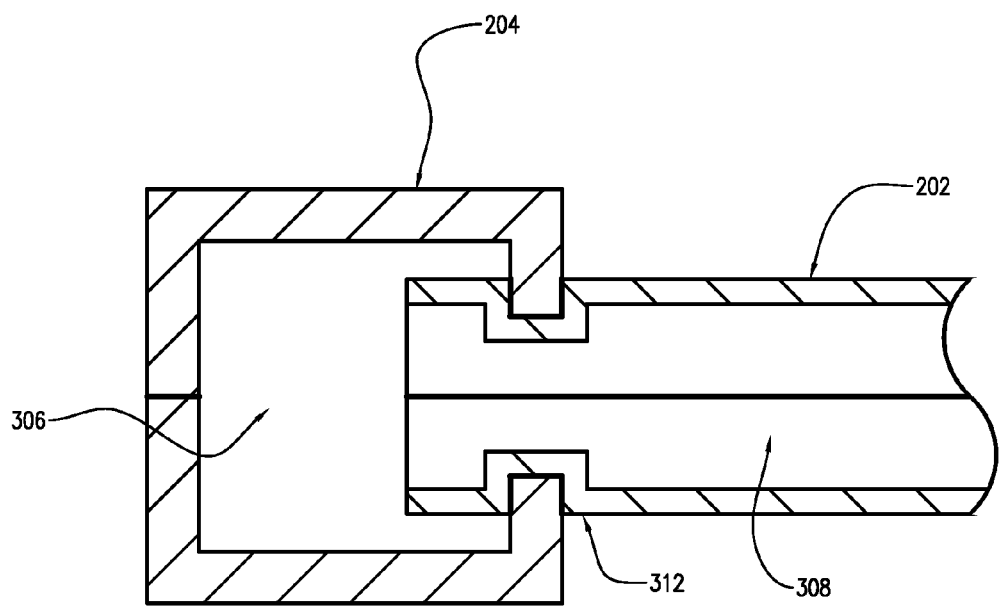
Figure 4:
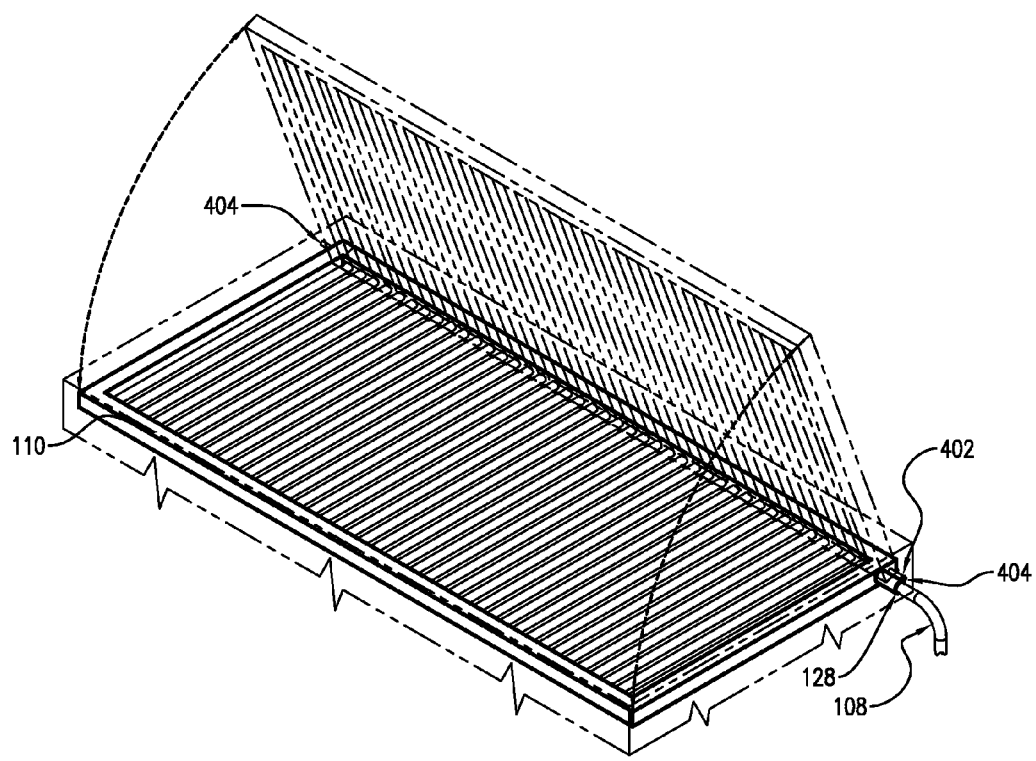

FIG. 1 is a block diagram of a cooking grill;
FIG. 2 is a block diagram of a grill grate;
FIG. 3 is a block diagram of a particular embodiment of the connection of a plurality of ribs to a grill grate support frame in a grill grate; and
FIG. 4 is a block diagram of a particular embodiment of a grill grate.

VI. DETAILED DESCRIPTION

Referring to FIG. 1, an illustrative embodiment of a cooking grill is depicted and generally designated 100. The cooking grill 100 includes an oil reservoir 102, an oil reservoir line 104 attached to the oil reservoir 102, a pump 106 attached to the oil reservoir line 104, an oil line 108 attached to the pump 106, a grill grate 110 attached to the oil line 108, a grill lid 112, and an actuating rod 114. The actuating rod 114 is attached to the grill lid 112 and the pump 106 such that when the grill lid 112 is opened and/or closed, the actuating rod 114 activates the pump 106 and pumps oil up the oil line 108 and into the grill grate 110. In a particular embodiment, the cooking grill includes a return oil line 130.

The oil reservoir 102 contains a fluid 116. In a particular embodiment, the fluid 116 is cooking oil, or some other oil or fluid that may be used to season the grill grate 110. The oil reservoir 102 is of sufficient size and structure to contain the fluid 116 and the size and structure depends on the size of the grill grate 110. For a relatively small grill grate 110, the oil reservoir 102 may be relatively small while for a relatively large grill grate 110, the oil reservoir 102 may be relatively large. If a relatively small oil reservoir 102 is used for a relatively large grill grate 110, then frequent refilling of the oil reservoir 102 can occur. For example, an oil reservoir with a one gallon capacity would be of sufficient size for a 19 inch long by 26 inch wide grill grate. However, a larger or smaller oil reservoir 102 may be used. The oil reservoir 102 may be made out of metal, plastic, or other material that can contain the fluid 116. The oil reservoir 102 contains an oil reservoir line attachment 118. The oil reservoir line 104 is attached to the oil reservoir line attachment 118 such that the fluid 116 in the oil reservoir 102 can flow out of the oil reservoir 102, through the oil reservoir line 104, and to a pump oil reservoir line attachment 122 on the pump 106.

The pump 106 is capable of creating enough negative pressure to draw the fluid 116 from the oil reservoir 102, through the oil reservoir line 104 and the pump oil reservoir line attachment 122, and into the pump 106. The pump 106 may be a gear pump, pneumatic pump, piston pump, manual foot pump, hand pump, a hydraulic pump, or any other pump that can pump the fluid 116 from the oil reservoir 102 and into the grill grate 110. In a particular embodiment, the pump 106 is a geared pump. In another particular embodiment, the pump 106 is a ratcheted gear pump. The operation of the ratcheted gear pump is discussed below.

During use, the actuating rod 114 activates the pump 106 to draw the fluid 116 from the oil reservoir 102 and push the fluid 116 through the oil line 108. Oil line 108 is attached to the pump 106 by pump oil line attachment 126. The pump 106 is capable of creating enough positive pressure to push the fluid 116 from the pump 106, through the oil line 108, and into the hollow grill grate 110. In a particular embodiment, the pump 106 contains a release valve 120 such that when the pressure in the pump exceeds a certain level, the pressure is released. For example, if the hollow grill grate 110 is a closed system, pressure can build up in the oil line 108 as fluid is pumped through the oil line 108 and into the hollow grill grate 110.

The grill grate 110 has grill oil line attachment 128 such that the oil line 108 may be securely attached to the grill grate 110. In one embodiment, the grill oil line attachment 128 contains a swivel fitting such that when the grill is opened or closed, the oil line 108 does not become kinked or bent. The grill grate 110 contains a plurality of hollow ribs (shown in FIG. 2) that allow the fluid 116 to flow through the grill grate 110. In a particular embodiment, the grill grate 110 contains grill oil return line attachment 132. The grill oil return line attachment 132 connects the grill grate 110 to an oil return line 130 to allow the fluid 116 to flow through the grill grate and back to the oil reservoir 102 through return oil reservoir line attachment 134. In one particular embodiment, the grill oil return line attachment 132 is located on the opposite side of the grill oil line attachment 128.

In another particular embodiment, the grill grate 110 contains a drain plug 208 (shown in FIG. 2). The drain plug 208 allows oil to be drained from the grill grate 110 or allows air to escape from the grill grate 110. In one particular embodiment, the drain plug 208 is a bull plug. In another particular embodiment, the drain plug is a pressure release valve.

In a particular embodiment, pump 106 is a ratcheted gear pump. For example, ratchet 124 is a ratchet arm or ratchet socket wrench attached to the pump 106. During use, when the grill lid 112 is lifted, the actuating rod 114 is drawn generally upwards pulling the ratchet arm 124 up and activating the ratchet mechanism of the ratchet arm 124 or ratcheted gear pump such that very little, if any, extra resistance from the pump 106 is observed when lifting the grill lid 112. Then, when the grill lid 112 is lowered, the actuating rod 114 is drawn generally downwards pushing the ratchet arm 124 down such that the pump 106 is activated and the fluid 116 is drawn from the oil reservoir 102 and into the grill grate 110. If a pump other than a ratcheted gear pump is used, such as gear pump, pneumatic pump, piston pump, or a hydraulic pump, then the lifting and/or lowering of the grill lid 112 will activate the pump to draw the fluid 116 from the oil reservoir 102 and into the grill grate 110.

In a particular embodiment, the pump 106 is manually operated by a user as opposed to being operated upon movement of the grill lid 112. For example, the actuating rod 114 may be replaced by an electrical switch, a hand pump, a foot pump, or any other means that can activate the pump 106 and draw the fluid 116 from the oil reservoir 102 and into the grill grate 110. The grill 100 has both personal and residential applications and may be suitably used in a home or a public eatery.

Referring to FIG. 2, an illustrative embodiment of a grill grate is depicted and generally designated 200. The grill grate 200 may operate in a similar manner and function as the grill grate 110 (FIG. 1). The grill grate 200 forms a cooking surface and contains a plurality of ribs 202, a grill grate support frame 204, and a grill oil line attachment 206. The grill oil line attachment 206 may operate in a similar matter and function as the grill oil line attachment 128. In a particular embodiment, the grill grate 110 (FIG. 1) contains the drain plug 208 as discussed above.

In a particular embodiment, the support frame 204 has a generally rectangular shaped profile and can fit into and function on a convention grill. One particular advantage of the present invention is that the grill grate 200 may be used to replace an existing grill grate in an existing grill. The support frame 204 has an inside diameter such that the fluid 116 (FIG. 1) may pass through the support frame 204 and to the plurality of ribs 202. The support frame 204 provides support for the plurality of ribs 202.

The ribs 202 have an inside diameter such that the fluid 116 (FIG. 1) may flow through the plurality of ribs 202. In a particular embodiment, each plurality of rib 202 is made of a porous material such that as the fluid 116 (FIG. 1) is pumped throughout the plurality of ribs 202, the heat applied to the plurality of ribs 202 from a heat source in the grill 100 (FIG. 1) will cause the porous material of the ribs 202 to expand and to open the pores of the porous material and enable the fluid 116 (FIG. 1) to be diffused throughout the plurality of ribs 202. In a particular embodiment, the plurality of ribs 202 are made of cast iron. The process of expanding the material that comprises the plurality of ribs 202 and allowing the fluid 114 (FIG. 1) to leach out allows for the cooking surface of the grill grate 200 to be seasoned with the fluid 114 (FIG. 1) without the need for spaying or mopping of the grill grate 200 by a user. The type of porous material that comprises the ribs 202, the viscosity of the fluid 114 (FIG. 1) used, and the amount of heat applied to the ribs 202 from the heat source in the grill 100 (FIG. 1) are factors that affect the rate of diffusion of the fluid 114 (FIG. 1) and will in turn dictate the level of consumption of the fluid 114 (FIG. 1).

The inside diameter of the plurality of ribs 202 may be a different diameter than the inside diameter of the support frame 204. In a particular embodiment, the inside diameter of the plurality of ribs 202 and the support frame 204 are such that the fluid 116 flows evenly throughout the grill grate 110. The support frame 204 and the plurality of ribs 202 may have a circular profile, a square profile, diamond shaped profile, or any other profile that allows for an inside diameter such that the fluid 116 can flow throughout the grill grate 110.

Referring to FIG. 3, the plurality of ribs 202 and the grill grate support frame 204 may be connected by a plurality of geometric configurations, or by a connecting means comprising welding, casting, or molding the parts together. The plurality of ribs 202 and the grill grate support 204 in FIG. 3 are the same plurality of ribs 202 and the grill grate support 204 in FIG. 2. In a particular embodiment, the grill grate support frame 204 contains an opening where the plurality of ribs 202 can be inserted. The plurality of ribs 202 contain a mating profile 312 such that upon insertion of the plurality of ribs 202 into the grill grate support frame 204, the plurality of ribs 202 are rigidly secured to the grill grate support frame 204. The grill grate support frame 204 contains an inner cavity 306 where the fluid 114 (FIG. 1) may flow. Similarly, the plurality of ribs 202 also contain an inner cavity 308 where the fluid 114 (FIG. 1) may flow. In a particular embodiment, half of the grill grate support frame 204 and the plurality of ribs 202 are formed together, for example in a machine stamp or mold. Then, the other half of the grill grate support frame 204 and the plurality of ribs 202 also are formed together in a similar fashion and the two halves are joined together, for example by welding or some other means to secure the two half together.

Referring to FIG. 4, a connection point 402 enables the grill grate 110 to pivot about both a pivot pin 404 and the connection point 402. The connection point 402 and the pivot pin 404 allows the grill grate 110 to rotate upwards and allows access to a heat source that is typically located below the grill grate 110.

The grill grate 110 may be developed as an after-market product for installation upon an existing grill, or in the alternative, is integrated into the design of a grill prior to construction.

Those of skill would further appreciate that the various illustrative logical blocks, structures, configurations, modules, and steps described in connection with the embodiments disclosed herein may be implemented in varying ways. Various illustrative structures, components, blocks, configurations, modules, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A grill comprising:
a grill grate, wherein the grill grate is hollow such that an oil based fluid can flow inside of the grill grate, wherein the grill grate is made of a porous material such that as heat is applied to the grill grate, the porous material of the grill grate expands to allow the oil based fluid inside the grill grate to leach out and, when the grill grate is cooled, the pores of the porous material substantially prevents the oil based fluid inside the grill grate from leaching out, the rate of diffusion being substantially dependent upon a type of the porous material, viscosity of the oil based fluid, and amount of heat applied;
an inlet attached to the grill grate;
a fluid container to contain at least a portion of the oil based fluid; and
a pump to pump the oil based fluid from the fluid container and into the grill grate though the inlet.

2. The grill of claim 1, wherein the pump is a ratcheted gear pump.

3. The grill of claim 2, further comprising:
a grill lid, wherein the grill lid has a closed position such that in the closed position the grill lid covers the grill grate and an open position such that in the open position the grill lid allows access to the grill grate; and
an actuating rod attached to the grill grate and the pump, wherein as the grill lid is transitioned from the open position to the closed position, the pump is activated and the oil based fluid flows into the grill grate.

4. The grill of claim 1, wherein the oil based fluid is cooking oil.

5. The grill of claim 1, further comprising a drain plug on the grill grate.

6. The grill of claim 1, wherein the pump is a manual foot pump.

7. The grill of claim 1, wherein the grill grate is made of cast iron.

8. The grill of claim 1, wherein the grill grate contains a return fluid line that is connected to the fluid reservoir and can return the oil based fluid from the grill grate to the fluid reservoir.

9. A method for seasoning a grill, the method comprising:
providing a grill grate, wherein the grill grate is made of a porous material such that as heat is applied to the grill grate, the porous material of the grill grate expands to allow the oil based fluid inside the grill grate to leach out and, when the grill grate is cooled, the pores of the porous material substantially prevents the oil based fluid inside the grill grate from leaching out, the rate of diffusion being substantially dependent upon a type of the porous material, viscosity of the oil based fluid, and amount of heat applied;
pumping an oil based fluid into a grill grate using a pump, wherein the grill grate is hollow such that the oil based fluid can flow inside of the grill grate.

10. The method of claim 9, wherein the oil based fluid is cooking oil.

11. The method of claim 9, wherein the pump is a ratcheted gear pump.

12. The method of claim 11, further comprising closing a grill lid by transitioning the grill lid from an open position to a closed position wherein the closing of the grill lid actuates the ratcheted gear pump to pump the oil based fluid into the grill grate.

13. The method of claim 12, further comprising opening the grill lid from the closed position to the open position wherein the opening of the grill lid actuates the ratcheting mechanism of the ratchet gear pump.

14. The method of claim 9, wherein the pump is a foot pump.

15. The method of claim 9, wherein the pump contains a release valve to release pressure when the pressure exceeds a predetermined amount.

16. A grill grate comprising:
a hollow frame, wherein the hollow frame contains an inlet to allow an oil based fluid to flow into the hollow frame;
a plurality of hollow ribs contained within the hollow frame wherein the hollow ribs are attached to the hollow frame such that the oil based fluid can flow throughout the plurality of hollow ribs; wherein the plurality of hollow ribs are made of a porous material such that as the plurality of hollow ribs are heated the porous material expands to allow the oil based fluid inside the plurality of hollow ribs to leach out, wherein when the plurality of hollow ribs is cooled, the porous material substantially prevents the oil based fluid inside the plurality of hollow ribs from leaching out; the rate of diffusion being substantially dependent upon a type of the porous material, viscosity of the oil based fluid, and amount of heat applied.

17. The grill grate of claim 16, wherein the oil based fluid is cooking oil.

* * * * *